Dec. 10, 1957 W. B. TALIPSKY ET AL 2,815,671
POSITIVE DRIVE BELT
Filed June 30, 1955 2 Sheets-Sheet 1
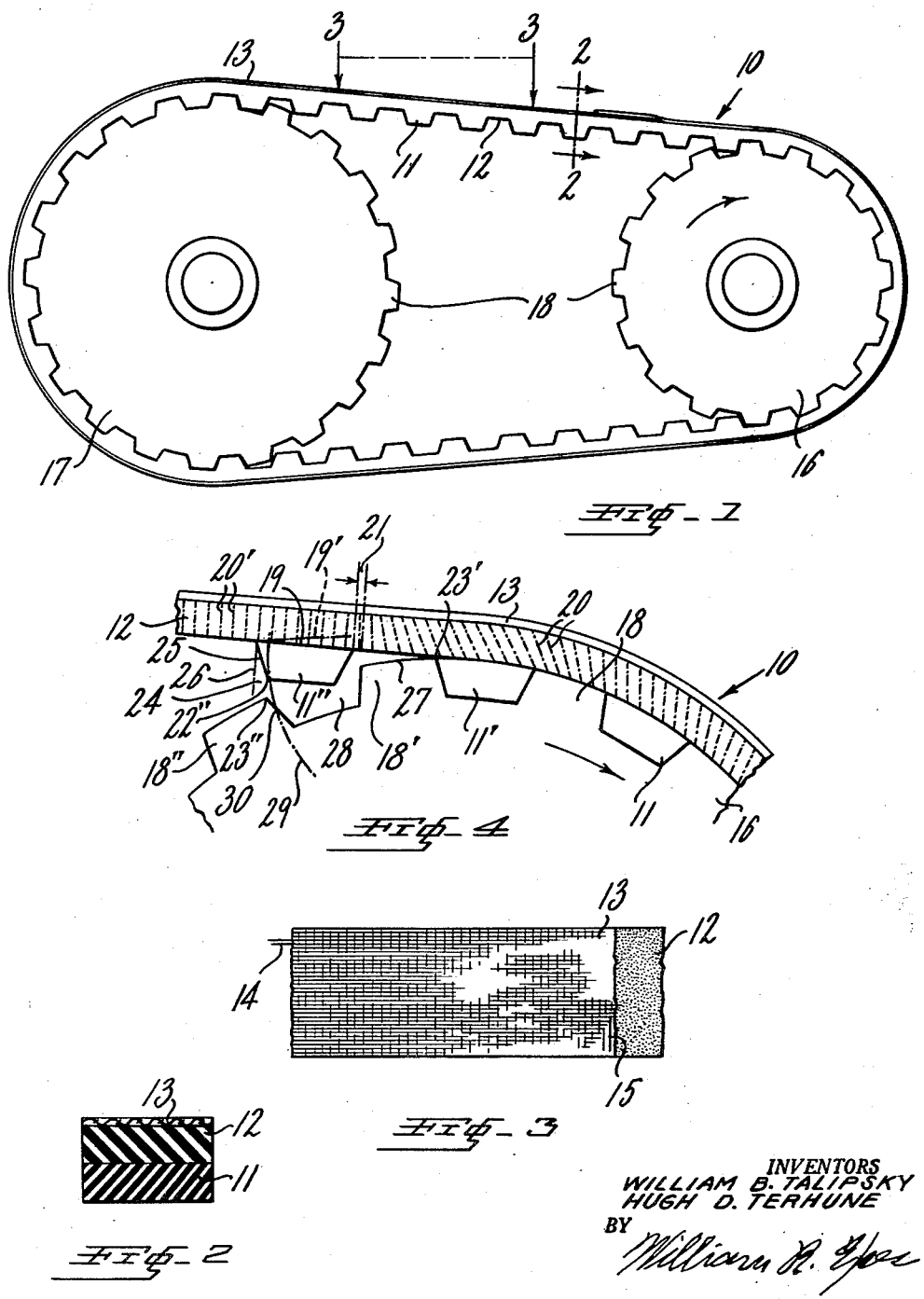
INVENTORS
WILLIAM B. TALIPSKY
HUGH D. TERHUNE
BY
ATTORNEY Dec. 10, 1957　　W. B. TALIPSKY ET AL　　2,815,671
POSITIVE DRIVE BELT Filed June 30, 1955　　　　　　　　　　2 Sheets-Sheet 2

INVENTORS
WILLIAM B. TALIPSKY
HUGH D. TERHUNE
BY William H. Eper
ATTORNEY

United States Patent Office
2,815,671
Patented Dec. 10, 1957

2,815,671
POSITIVE DRIVE BELT

William B. Talipsky, Bristol, and Hugh D. Terhune, Levittown, Pa., assignors to United States Rubber Company, New York, N. Y., a corporation of New Jersey Application June 30, 1955, Serial No. 519,042

6 Claims. (Cl. 74—229)

This invention relates to an improved silent positive drive belt having wear resistant rubber teeth united by a cushioning layer of softer rubber to an ndless flexible load carrying band.

The belt embodying this invention is particularly useful for silent, and light duty positive drives. This belt is an improvement upon other positive drive belts in this field in respect to its flexibility and its ability to withstand shock loads imposed upon the rubber teeth, which are bonded to and cushioned by a softer cushioning layer of rubber interposed between the harder wear resistant teeth and the flexible load carrying band. The surface of the resilient rubber teeth and the softer cushioning layer of rubber make direct contact with the harder pulley teeth and thereby produce a silent operating belt. The cushioning layer also protects the load carrying band from being cut and abraided by the relatively harder pulley teeth.

The term "rubber" is used herein to designate natural and/or synthetic rubber compositions, and organic plastics having similar physical characteristics, and mixtures of such rubber compositions and other compatible organic plastics.

The belt embodying this invention, and its foregoing advantages and objects are further described in reference to the accompanying drawing, in which:

Fig. 1 is a side elevational view of two pulleys and the belt embodying this invention geared to the pulleys;

Fig. 2 is an enlarged transverse cross section of the belt taken on line 2—2 of Fig. 1;

Fig. 3 is a top plan view of a portion of the belt in Fig. 1, as indicated by the arrows 3—3;

Fig. 4 illustrates the performance of the belt under a momentary overload, or shock load;

Figure 5:
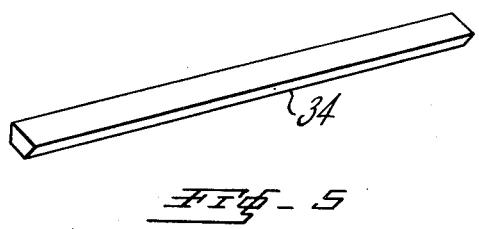
Fig. 5 is an isometric view of an extruded strip of rubber from which the belt teeth are made.

Referring to Figs. 1, 2 and 3, the belt 10 embodying this invention is provided with equally spaced rubber teeth 11, which are bonded to one side of a softer cushioning layer 12 of rubber having its opposite side bonded to a flexible load carrying band 13 containing yarns 14 extending lengthwise of the belt 10. Such yarns 14 carry substantially the entire load imposed upon the belt. The yarns 14 are so arranged that the average angle between them and the direction of movement of the belt is substantially zero. Such arrangement causes the belt to run straight on the pulleys instead of to one side as in the case where the yarns are at an angle to the belt movement. The band 13, for example as shown in Fig. 3, is made of a woven textile fabric having a thickness of .008 inch in which the yarns 14 extending in one direction are arranged longitudinally of the belt, and the yarns 15 extending transversely thereto are arranged transversely of the belt. Since the transverse yarns 15 carry no load, they may be relatively weak and widely spaced. Greater strength and flexibility per unit weight of fabric may be obtained by using a fabric of this latter construction. Other constructions of the load carrying band 13 may be used. For example, the transverse yarns 15 may be omitted, and a weftless fabric containing only the longitudinal yarns 14 may be used, in which the yarns are bonded together with a flexible adhesive compatible with rubber.

The longitudinal yarns or strands 14 may be made of any strong flexible material which when made into a load carrying band 13 is substantially non-stretchable under the maximum load to be imposed on the belt. Suitable materials such as cotton yarns made and/or treated to remove stretch, continuous glass fiber filament yarns, and fine wire may be used for the longitudinal yarns or strands 14.

The belt 10 is adapted to transmit power from the driving pulley 16 to the driven pulley 17, in which the teeth 11 of the belt engage the teeth 18 of the pulleys 16 and 17 to form a positive light duty drive. The pulley teeth 18 are made of relatively rigid material, such as metal, or hard plastics, and the belt teeth 11 are made of somewhat yieldable resilient rubber material, but it is sufficiently firm to maintain its shape under the pressure of the normal load imposed thereon. Such yieldable rubber teeth and cushioning layer 12 which come in direct contact with the harder pulley teeth 18 produces a silent positive drive.

The specifications for the above elements of the drive depends upon the load in pounds per inch of width to be imposed on the belt. Having selected the maximum overload or shock load to be imposed on the belt, the load carrying band is designed to carry such loads without stretching any substantial amount. The rubber teeth 11 and cushioning layer 12 are also designed to carry such loads without rupture, but to yield a limited amount under such loads to minimize the high stresses which would otherwise be induced in the band between the teeth 11 and the band 13.

The performance and design of the belt 10 is explained in reference to Fig. 4. When the belt teeth 11 are in mesh with the teeth 18 of the driving pulley 16, the cushioning rubber 12 is subjected to shear stresses between the bases 19 of the teeth 11 and the band 13. Under the maximum continuous or normal load imposed on the belt there is substantially no change in the pitch of the teeth 11 or displacement of the belt teeth 11 in respect to the band 13. The hardness and thickness characteristics of the cushioning layer 12 of rubber are selected to cause the belt to perform as set forth above.

The coaction between the elements of the belt 10 under a shock load or overload is illustrated in Fig. 4 on an exaggerated scale. The strains in the rubber cushioning layer 12 resulting from the shearing forces between the teeth 11 and the load carrying band 13 are shown by the dot-dash lines 20 which are at an angle to the dot-dash lines 20' in the portion of the layer 12, which is advancing towards the pulley 16 and is not subjected to the shearing forces. The pitch, or distance between the belt teeth 11 in mesh with the pulley teeth 18 cannot change when the shock load occurs, but such teeth are displaced by the shearing forces as a whole in respect to the load carrying band 13 a distance equal to the shear strains in the cushioning layer 12, as represented by the linear distance 21. Such displacement of the belt teeth 11 in mesh with the pulley teeth 18 produces a change in the distance between the last belt tooth 11' meshing with the pulley teeth 18 and the next advancing tooth 11", which change is equal to such displacement 21. If the shock load is momentary, the shear stresses and strains in the cushioning layer 12 and the change in pitch between the two belt teeth 11'—11'' may disappear before the next tooth comes into position for engagement. If so, the advancing belt teeth will mesh with the pulley teeth without interference of the belt tooth 11'' with the pulley tooth 18''. However, if the overload on the belt 10 should continue to exist, there would be cushioned interference between the teeth until the overload was relieved. In other words, if the strains are not relieved in the cushioning layer 12 at the time the advancing tooth 11'' begins to mesh with the pulley tooth 18'', the teeth 11'' and 18'' may mesh with some interference, provided the displacement 21 of teeth 11, 11' in mesh with the teeth 18, 18' is insufficient to prevent the trailing edge 22'' of the belt tooth 11'' from passing over the leading edge 23'' of the pulley 18''. The amount of permissible displacement 21 depends upon the size of angle 24 between the sides 25 of the belt teeth 11 and a perpendicular 26 to the flat side of the belt. Within the limit of an operative angle 24, the displacement 21 may be increased as the angle 24 is increased.

As the belt 10 advances onto the pulley 16, the cushioning layer 12 rides on the addendum 27 of the pulley teeth 18. For practical purposes the trailing edge 22'' may be considered to pivot about the leading edge 23' of the pulley tooth 18' and to pass in an arc 29 of a circle centered on the pivotal edge 23'. It will be noted that such arc 29 passes into the well 28 slightly in advance of the leading edge 23'' of the pulley tooth 18'', and intersects the tooth 18'' at 30. If the strains remain in the cushioning layer 12, the trailing edge 22'' will meet interference with the pulley tooth 18'' at 30, but due to the resilience of the tooth 18'' and the softer layer 12 the tooth 11'' can mesh with the tooth 18''. As the teeth mesh with the driving tooth 18'' tends to deform the edge 22'' of belt tooth 11'' and drives its forwardly into mesh. The soft rubber cushioning layer 12 permits the base 19 to cock to the exaggerated position 19' and mesh with the pulley tooth.

In order that the belt 10 may perform as above described, the rubber teeth should have a hardness of from 75 to 90 Shore A durometer, and the cushioning layer 12 of softer and lower modulus rubber, should have a hardness of from 50 to 65 Shore A durometer. The cushioning layer 12 should have a thickness ranging from .005 to .030 inch depending upon the pitch of the teeth, the size of the pulleys on which the belt is adapted to run, and the load per unit width of the belt to be carried thereby. The thickness of the layer of rubber may be increased where the diameter of such pulley is increased, but in the event the thickness exceeds .030 inch, the belt teeth may have too much freedom of movement in respect to the load carrying band 13, and the change in the original pitch of the teeth may be too great to permit them to mesh with the pulley teeth when the belt is under load.

Figure 6:
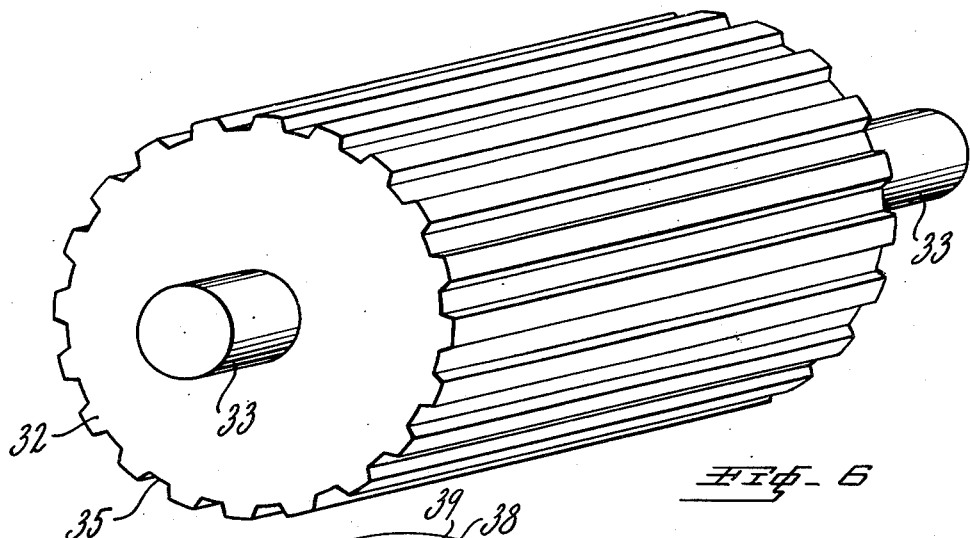
Fig. 6 is an isometric view of a vulcanizing mold on which the belt parts are to be assembled and vulcanized.

The belt parts may be assembled and vulcanized on the mold 32 shown in Figs. 5 and 6 which may be supported on the trunnions 33. The belt teeth 11 are extruded in long strips 34 (Fig. 5) having a cross section conforming to the transverse cross section of the teeth as shown in Fig. 1. The surface of the mold is treated with a lubricant and the strips 34 are laid in the grooves 35 of the mold, which are spaced from each other a distance equal to the pitch of the teeth of the belt to be made. The mold 32 is provided with a number of grooves 35 equal to the number of teeth to be formed on the belt. After the grooves have been filled, a calendered sheet 36 of rubber having the composition and thickness of the cushioning layer of rubber 12 in the belt 10 is wound around the mold 32 and rolled down against the bases 37 of the strips 34 and bonded thereto. The edges 38 and 39 of the sheet 36 abut each other to form a butt seam between such edges. However, to insure sufficient rubber at the seam to form a union between the edges 38 and 39, they may overlap each other slightly.

Figure 7:
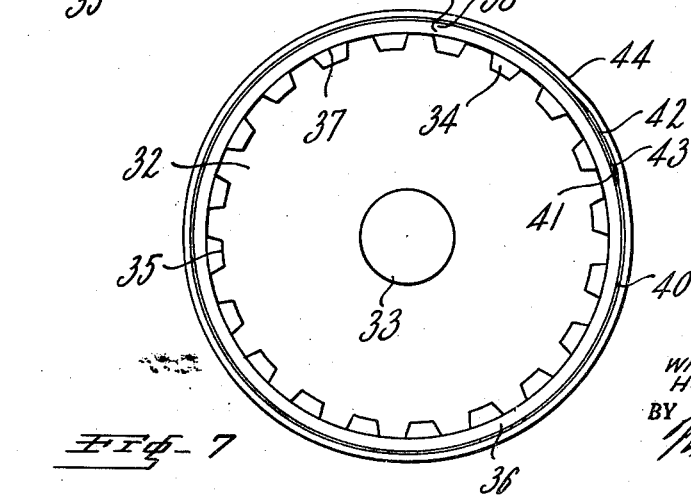
Fig. 7 is an end view of the vulcanizing mold shown in Fig. 6, but having the belt parts assembled thereon and wrapped for vulcanization under the pressure of the wrapping.

The load carrying band 13, is then wrapped around the sheet of rubber 36. The band 13 may be made of the materials referred to hereinabove. As shown in Fig. 7, the band is made of woven fabric 40, and its edges 41 and 42 are overlapped to form a lapped joint 43.

A solvent is applied to the surface of the rubber sheet 36 before the fabric 40 is wrapped around it in order to soften the rubber and cause the fabric to adhere thereto. The rubber coating on the fabric 40 may also be wiped with the solvent to cause its edges 41 and 42 to unite. In wrapping the fabric 40 around the mold 32, the yarns corresponding to the yarns 14 in the belt extend circumferentially of the mold, and tension is applied to such yarns to transmit radial pressure to the sheet 36 and cause its ends 38 and 39 to unite. Further pressure is applied to the sheet rubber 36 and fabric 40 by wrapping a strip of fabric 44 under tension around the mold 32 in accordance with usual practice to place the sheet rubber 36 and tooth strips 34 under pressure during the vulcanization of the rubber parts. The wrapped mold 32 is then placed in the vulcanizer and the rubber parts thereon are vulcanized in accordance with usual practice.

After the band of rubber 36 and tooth strips 34 adhered thereto have been vulcanized into a unitary structure with the fabric 40, the wrapping 44 is removed from the fabric 40, and such vulcanized unitary structure forming a wide belt is removed from the mold 32. This may be done by using a collapsible mold or by applying a clamp to the outer periphery of the belt and forcing it off the end of the mold. The wide belt is then cut circumferentially at distances along its width or the axis of the circumferential band to form belts 10 of the desired width.

While the preferred form of the belt and the method of making same is described in detail herein, it will be understood that changes in such details may be made without departing from the spirit of the invention, and it is intended to cover all such changes which may come within the scope of the appended claims.

Having thus described our invention, what we claim and desire to protect by Letters Patent is:

1. An endless belt comprising rubber teeth having exposed rubber surfaces adapted to engage gear wheel teeth, said rubber teeth having their bases bonded to one side of a flexible cushioning layer of resilient rubber which is softer than said rubber teeth, a load carrying band bonded to the other side of said cushioning layer, and said band containing strands arranged lengthwise of said belt and which carry substantially the entire load to be imposed on said belt without stretching substantially.

2. An endless belt comprising rubber teeth having exposed rubber surfaces adapted to engage gear wheel teeth, said rubber teeth having bases bonded to one side of a cushioning layer of rubber which is softer than said rubber teeth, said rubber teeth having a hardness of from 75 to 90 Shore A durometer, said cushioning layer having a hardness of from 50 to 65 Shore A durometer, a load carrying band bonded to the other side of said cushioning layer of rubber, and said band containing strands arranged lengthwise of said belt and which carry substantially the entire load to be imposed on said belt without stretching substantially.

3. An endless belt comprising rubber teeth having exposed rubber surfaces adapted to engage gear wheel teeth, said rubber teeth having their bases bonded to one side of a flexible cushioning layer of rubber which is softer than said rubber teeth, a load carrying band bonded to the other side of said cushioning layer, said rubber teeth having a hardness of from 75 to 90 Shore A durometer, said cushioning layer having a hardness of from 50 to 65 Shore A durometer and a thickness of from .005 inch to .030 inch, and said load carrying band containing strands arranged lengthwise of said belt and having portions overlapping each other to form a lap joint, and said strands being adapted to carry substantially the entire load to be imposed on said belt without stretching substantially.

4. An endless belt comprising bare rubber teeth bonded to one side of a flexible cushioning layer of resiliently yieldable rubber which is softer than said rubber teeth, a load carrying band bonded to the other side of said cushioning layer, said band containing discontinuous textile yarns extending circumferentially of said belt and having their ends adhesively united by a lap joint, and said yarns being adapted to carry substantially the entire load to be imposed on said belt without stretching substantially.

5. An endless belt comprising bare rubber teeth having their bases bonded to one side of a cushioning layer of resiliently yieldable rubber which is softer than said rubber teeth, a relatively thin flexible load carrying band of woven textile fabric bonded to the other side of said cushioning layer, said rubber teeth having a hardness of from 75 to 90 Shore A durometer, said cushioning layer having a hardness of from 50 to 65 Shore A durometer, said band containing discontinuous textile yarns extending substantially parallel to the length of said belt and having their ends adhesively united by a lap joint, and said yarns being adapted to carry substantially the entire load to be imposed on said belt without stretching substantially.

6. An endless belt comprising bare rubber teeth bonded to one side of a resilient yieldable cushioning layer of rubber which is softer than said rubber teeth, said rubber teeth having a hardness of from 75 to 90 Shore A durometer, and said cushioning layer having a hardness of from 50 to 65 Shore A durometer and a thickness of from .005 to .030 inch, a flexible load-carrying band of woven textile fabric bonded to the other side of said cushioning layer of rubber, said fabric having yarns extending in the lengthwise direction of said belt which are adapted to carry substantially the entire load to be imposed on said belt without stretching substantially, and said fabric having a thickness of from .005 to .030 inch.

References Cited in the file of this patent

UNITED STATES PATENTS

| | | |
|---|---|---|
| 1,492,145 | Talley | Apr. 29, 1924 |
| 1,611,829 | Freedlander | Dec. 21, 1926 |
| 1,828,136 | Freedlander | Oct. 20, 1931 |
| 1,920,525 | Roderwald | Aug. 1, 1933 |
| 2,348,522 | Case | May 9, 1944 |